(12) United States Patent
Zhang et al.

(10) Patent No.: US 7,296,920 B2
(45) Date of Patent: Nov. 20, 2007

(54) MIXER FOR A PLASTICIZING SCREW

(75) Inventors: Raymond W. Zhang, Brampton (CA); Denise D. Craig, Toronto (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 0 days.

(21) Appl. No.: 10/849,897

(22) Filed: May 21, 2004

(65) Prior Publication Data
US 2004/0257904 A1 Dec. 23, 2004

(30) Foreign Application Priority Data
Jun. 19, 2003 (WO) .................... PCT/CA03/00918

(51) Int. Cl.
*B28B 13/00* (2006.01)
*B01F 11/00* (2006.01)

(52) U.S. Cl. .................... 366/83; 425/208; 366/125; 366/79

(58) Field of Classification Search ................ 425/130, 425/205, 208; 366/125, 83, 79
See application file for complete search history.

(56) References Cited

U.S. PATENT DOCUMENTS

| | | | |
|---|---|---|---|
| 2,753,595 A | 7/1956 | Dulmage | |
| 3,652,064 A * | 3/1972 | Lehnen et al. ............... | 366/88 |
| 3,680,844 A * | 8/1972 | Menges et al. ............... | 366/79 |
| 3,687,423 A | 8/1972 | Koch et al. | |
| 3,701,512 A | 10/1972 | Schippers | |
| 3,730,492 A | 5/1973 | Maddock | |
| 3,788,614 A | 1/1974 | Gregory | |
| 3,870,284 A | 3/1975 | Kruder | |
| 3,941,535 A | 3/1976 | Street | |
| 4,107,788 A | 8/1978 | Anders | |
| 4,118,164 A * | 10/1978 | Wenger et al. ............... | 425/202 |
| 4,215,978 A * | 8/1980 | Takayama et al. ........... | 425/190 |
| 4,330,214 A | 5/1982 | Willert | |
| 4,416,606 A * | 11/1983 | Sugano et al. ............... | 425/202 |
| 4,639,143 A | 1/1987 | Frankland, Jr. | |
| 4,752,136 A * | 6/1988 | Colby ........................... | 366/89 |
| 4,840,492 A | 6/1989 | Nakamura | |
| 4,944,906 A | 7/1990 | Colby | |
| 5,035,509 A | 7/1991 | Kruder | |
| 5,219,590 A | 6/1993 | Kruder | |
| 5,572,331 A * | 11/1996 | Yu ................................ | 366/81 |
| 5,573,331 A * | 11/1996 | Lin .............................. | 366/81 |
| 5,965,173 A * | 10/1999 | Goldup ........................ | 425/205 |
| 6,059,440 A * | 5/2000 | Fuchs ........................... | 366/83 |
| 6,132,076 A | 10/2000 | Jana | |
| 6,227,692 B1 * | 5/2001 | Heathe ......................... | 366/81 |
| 6,488,399 B1 * | 12/2002 | Womer et al. ................ | 366/81 |
| 6,497,508 B1 * | 12/2002 | Womer et al. ................ | 366/81 |
| 6,565,348 B1 * | 5/2003 | Snijder et al. ............... | 425/209 |

OTHER PUBLICATIONS

Chris Rauwendaal, More Tips for Mixing in Single-Screw Extruders, Plastics World, Jan. 14, 1991, pp. 43 to 47, United States of America.

* cited by examiner

*Primary Examiner*—Robert B. Davis
*Assistant Examiner*—G. Nagesh Rao

(57) ABSTRACT

The invention provides an improved mixer section for a screw for a molding machine. The improved mixer section includes at least one conveying flight and at least one spill flight intersecting with the conveying flight. At least one notch is formed in the conveying flight to enable mixing between adjacent flow channels. The spill flight terminates near the output of the mixer to create a trap zone for any unmelts that reach that area of the mixer.

36 Claims, 4 Drawing Sheets

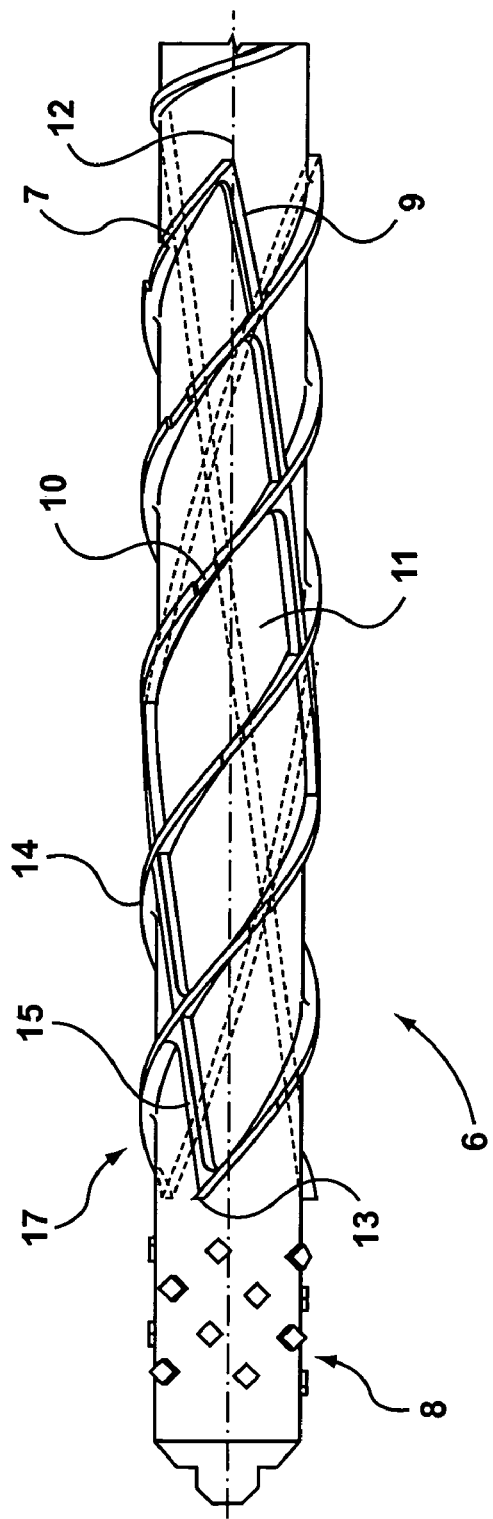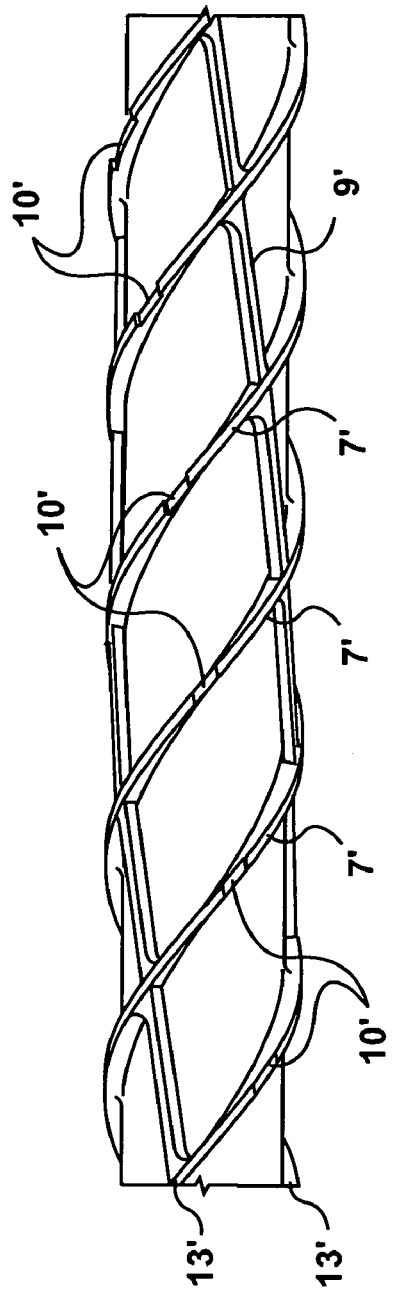
FIG. 2A
FIG. 2B

MIXER FOR A PLASTICIZING SCREW

TECHNICAL FIELD

This invention relates to a plasticating screw of a high output injection-molding machine. The plasticating screw has unique features for melting and mixing the resin.

BACKGROUND OF THE INVENTION

Plasticating screw designs for plasticizing plastic resin are many and varied. Designs that include mixing features and features for separating the melt from the unmelts are relevant to the present invention.

U.S. Pat. No. 4,330,214 to Willert teaches a plasticizing screw having a feed zone, a plasticizing zone and a metering zone. A second flight is introduced partway along the screw to provide a means of separating the melt from the unmelts. The melt pool flows over a spill flight and accumulates in a gradually deepening channel between the spill flight and a downstream conveying flight while the unmelts remain in a gradually shallowing channel between the spill flight and an upstream conveying flight. Willert does not include mixing features in the screw.

U.S. Pat. No. 3,870,284 to Kruder and later U.S. Pat. No. 5,219,590 to Kruder and Calland teaches a wave screw with a mixing section. The mixing section consists of a conveying flight and two divider flights each spaced from the conveying flight to divide the channel into three channels of varying cyclic depth in the helical direction of the channels. The portions of minimum depth of the channels define wave crests that are helically displaced from one another. The rotation of the screw causes a kneading-like action on the resin in the mixing section of the screw.

U.S. Pat. No. 6,227,692 to Heathe teaches a plasticating screw that comprises a feed zone, a compression zone, a waved melting zone, a spiral mixing zone that traps large agglomerations and contaminants and a second melting zone.

U.S. Pat. No. 6,132,076 to Jana et al teaches a vented screw with "undercut" spill flights to increase dispersive and distributive mixing. FIG. 2 lists a variety of prior art mixing designs that are typically used in combination with plasticating screws. One example is the "pineapple mixing section" at the screw tip.

U.S. Pat. No. 3,687,423 to Koch et al teaches a plasticating screw with a variable width channel having multiple cross channel dams that impede the flow of unmelts along the channel. The conveying flights have notches cut through them adjacent some of the dams to allow unmelts to move downstream and relieve pressure against the dam wall. The design creates large pressure drops in the barrel and creates dead spots next to the dams where resin can be trapped and degrade.

U.S. Pat. No. 4,107,788 to Anders teaches an extruder screw having a mixing section partway along the screw. The mixing section has multiple start conveying flights forming channels. Each channel has two dams with notches in the conveying flights at the dam sites and immediately upstream therefrom.

U.S. Pat. No. 4,639,143 to Frankland teaches an extrusion screw with a section partway along the screw having three parallel sets of grooved recesses in the melt channel that are designed to reduce the average shear heating effect and consequently, the material temperature, without reducing throughput. The design allows viscous materials to stagnate in the recesses, as there is no means to flush the recesses with fresh material.

U.S. Pat. No. 4,840,492 to Nakamura teaches a mixing screw having a mixing section partway along the screw. The mixing section has a series of recesses of varying width and varying channel depth to provide a combined mixing and kneading action. The design allows viscous materials to stagnate in the recesses, as there is no means to flush the recesses with fresh material.

U.S. Pat. No. 3,941,535 to Street teaches an extrusion screw having a section partway along the screw having notches in the conveying flights. There is no teaching of guiding the melt to pass through the notches and consequently material may become trapped in the notches and consequently degrade.

An overly aggressive plasticizing screw not only creates high levels of shear and degradation but also can generate so much heat in the melt by the shear heating effect of the screw that the barrel temperature will rise and exceed the set points for the barrel heaters and consequently trip overheat alarms causing a shutdown. These problems can arise when attempting to increase the throughput of any given size conventional plasticating screw.

While these problems may be overcome by providing larger or longer screws to increase the throughput of the screw, such solutions are expensive to implement and increase the space requirements of the plasticating unit. It is preferable to find a way to increase the throughput of the plasticating screw without changing its dimensional characteristics. The present invention achieves this objective by providing an improved mixing section that keeps agglomerate from passing through the screw, prevents the build-up of trapped material and ensures melting of all material in the screw without an unacceptable increase in temperature in the melt channel.

SUMMARY OF THE INVENTION

A primary objective of the present invention is to increase the flow through a plasticating screw to a molding machine without altering the dimensions of the screw. This objective is achieved by providing the screw with an improved mixing section.

More particularly, the improved mixing section includes at least one conveying flight and at least one spill flight. The flights are spirally wound around the screw and are, preferably, helical. Each spill flight terminates at a conveying flight to create a trap area for any solid material that may reach the end of the metering/mixing section and thereby prevent any solid material from passing into the molding machine itself. Each conveying flight includes notches therein to permit mixing of the flows in adjacent conveying channels. The conveying flights fit the barrel in such a way as to enable the flights to run on the inside surface of the barrel. The spill flights preferably have a diminishing clearance from the barrel as they extend towards the forward end of the section. This enables solid material to be trapped by the spill flight and conveyed back into the conveying flights until the solid material becomes molten and can pass into the injection unit.

More particularly, the present invention provides an improved mixing section for a plasticating screw for a molding machine that includes at least one conveying flight for conveying melt along the plasticating screw and at least one spill flight within said section. The spill flight terminates at a conveying flight near an exit of the section to form a trap zone for preventing solid material from being conveyed beyond said section. At least one notch is provided in the at least one conveying flight and is located remotely from the trap zone. The conveying flight winds around the screw at a first helix angle and the spill flight winds around the screw at a second different helix angle. The first helix angle is a forward helix angle.

The present invention also provides an improved plasticating screw for a Molding machine. The plasticating screw comprises at least a feed section, a compression section, and a mixing section. The mixing section has at least one conveying flight and at least one spill flight within the mixing section. Each spill flight ends at or near a point corresponding to an ending of a conveying flight to thereby form a trap zone for any solid material remaining in said section. The conveying and spill flights wind around the screw at differing helix angles and at least one notch is made in the conveying flight. The notch is located outside the trap zone.

BRIEF DESCRIPTION OF THE DRAWINGS

FIGS. 2A, 2B, 2C and 2D are side views of embodiments of the improved mixing section of the plasticating screw.

DETAILED DESCRIPTION OF THE PREFERRED EMBODIMENT(S)

Figure 1:
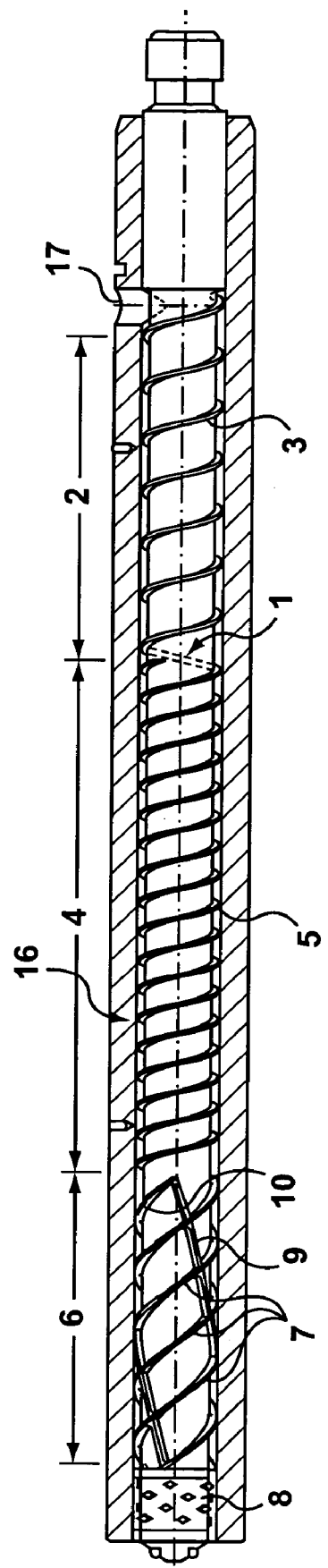
FIG. 1 is a side view of a plasticating screw with an improved mixing section in the barrel of a molding machine.

FIG. 1 illustrates the plasticating screw 1 with an improved mixing section 6 provided by the present invention. The screw 1 is contained in a heated barrel 16. The barrel 16 has an inlet port 17 and an outlet port (not shown) at the end of barrel 16. The screw 1 includes a feed section 2 having a single conveying flight 3, a compression section 4 having dual conveying flights 5, the improved mixing section 6 and a "pineapple" style mixer 8 at the screw tip. In the illustrated embodiment, section 6 has triple conveying flights 7 with some notches 10 and triple counter-helical spill flights 9 that act as dams. The spill flights 9 prevent solid material from moving along the channels created by the conveying flights 7. The notches 10 in the flights 7 provide more thorough mixing of the melt material within the conveying flights 7.

The feed and compression sections of the screw are conventional. The single conveying flight 3 feeds the material through the feed section in a manner well understood in the art. Similarly, compression section 4 compresses the material within the dual conveying flights 5 in a manner well understood in the art. For example, the screw described in commonly assigned U.S. Pat. No. 6,227,692 includes a feed section 22 and a compression section 24. A full description of the operation of these two sections is provided in that patent.

Figure 2C:
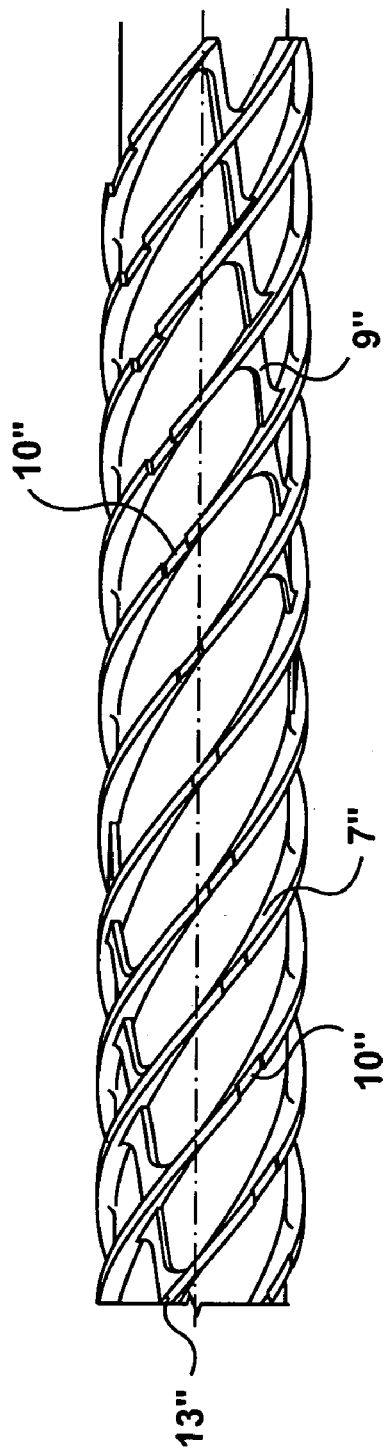
Figure 3:
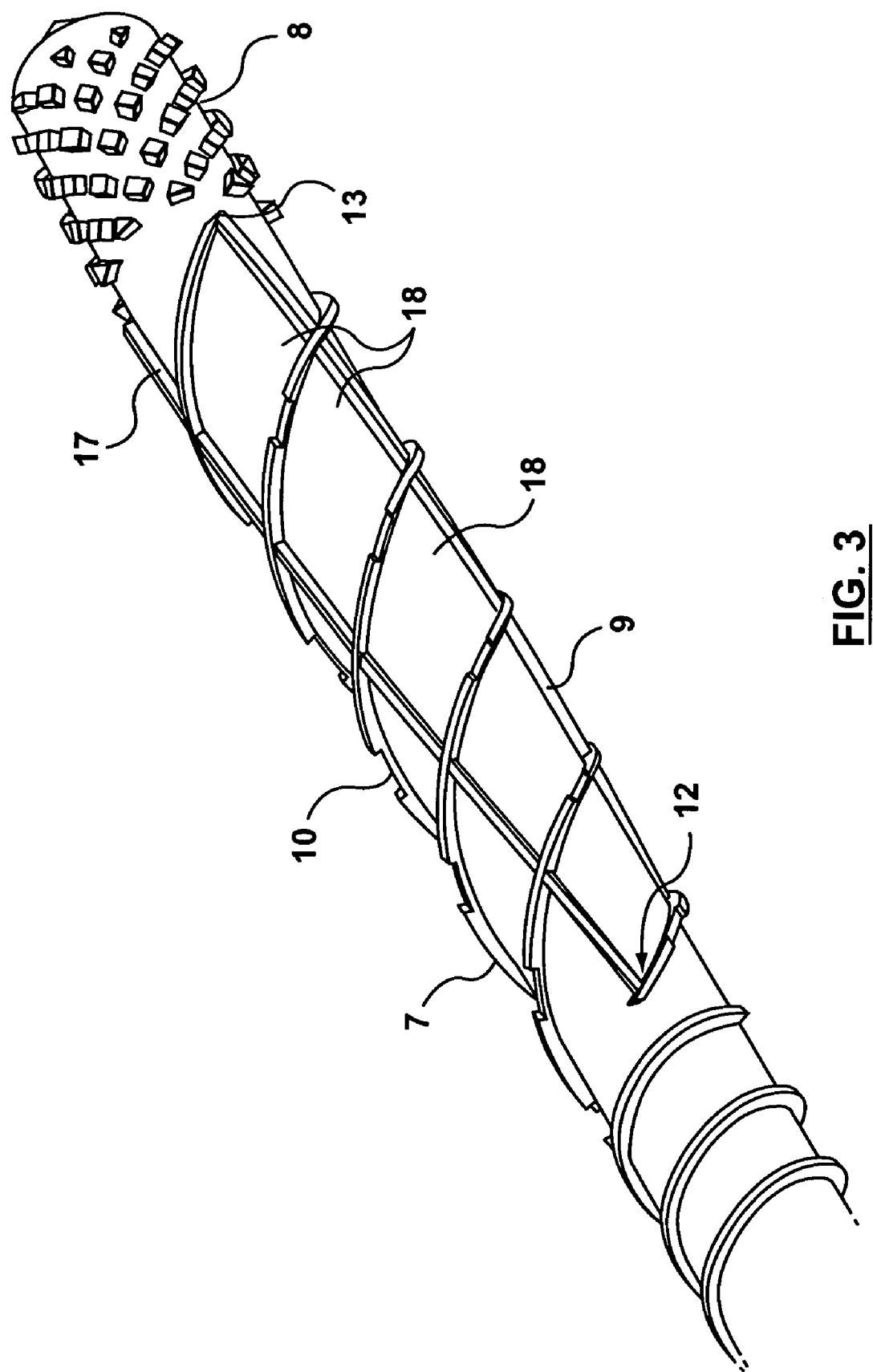
FIG. 3 is an isometric view of the portion of the plasticating screw shown in FIG. 2A.

A primary embodiment of the mixing section 6 is shown in FIGS. 2A and 3. The feed channels 18 (see FIG. 3) between the flights 7 are preferably designed with a constant depth so that they do not compress the melt during its passage through section 6. In the embodiment shown in FIG. 1, the volume of the resin leaving the compression section 4 is substantially equally accommodated by the volume of the admitting space entering the mixing section 6. This provides a more even and constant flow of melt to the injection unit.

However, if you wished to increase the shear and reduce the time the melt is within the section 6, the admitting space could be made less that the conveying space in section 4. Alternatively, a decrease in shear and increase in time within section 6 could be achieved by making the admitting space in section 6 larger than the conveying space leaving section 4.

The preferred correspondence between the volume space leaving section 4 and the volume space entering section 6 would be determined by such factors as the type and volume of resin to be processed and the amount of shear required. It has been the inventors experience that it is preferred to have the space volumes substantially equal, at least when processing polyethylene terephthalate (PET). This minimizes stress in section 6 and thereby avoids any substantial increase in temperature within the section. Also, equalizing the volumes maximizes the plasticizing capability of the screw without risking over shearing of the material.

Each of the conveying flights 7 make a number of helical turns around the screw shank 11 while the spill flights 9 make helical turns around the shank of the screw 11 in a direction opposed to the direction of the flights 7. The number of flights and turns and the helix angles of the flights 7 and 9 would be determined by the particular requirements of the application. For the particular application of interest to the present inventors it was found that three flights 7 making about one and one-half helical turns with a like number of spill flights 9 making about one-half a turn provided a satisfactory increase in the throughput of the plasticizing screw.

The four embodiments of the mixing section will now be described in more detail.

As shown in FIG. 2A, there are three conveying flights 7 and three spill flights 9. In this embodiment, each conveying flight 7 circumscribes the screw shank 11 approximately one and one-half turns at a forward helix angle. Each spill flight 9 makes approximately one-half of a turn and begins and ends at the end and beginning of a conveying flight 7 as shown at 12 and 13 and has a backward helix angle.

The conveying flights 7 are of a constant height throughout their length and run on the barrel except in areas where notches 10 (see FIG. 3) are provided. Notches 10 are formed at intervals along the conveying flights 7 to permit mixing of the melts from adjacent conveying channels 18. In the preferred configuration shown in FIGS. 2A and 3, the notches 10 are located about midway between adjacent intersections of the conveying and spill flights 7 and 9. However, other configurations of notches 10 could be contemplated. For example, each notch 10 could be separated to form two separate notches between intersecting flights.

It was found advantageous to gradually decrease the depth of the notches 10 as the conveying flights 7 approached the exit of the mixer section 6. The last notch in the flight must be of minimal height so that solid material cannot pass over it obviously, other modifications could be made in the notches 10 with satisfactory results, although it has been the inventors' experience that the arrangement of flights and notches shown in FIGS. 2A and 3 works the best for processing PET.

The three continuous spill flights 9 make about 0.5 to 1 helical turns around the screw shank 11. In these embodiments, these spill flights 9 turn around the screw shank 11 in the opposite direction to the conveying flights 7 within the length of the mixing section 6. However, they could turn around the screw in the same direction. This would require that they turn around the screw at a helix angle sufficiently differentiated from the helix angle of the conveying flights to ensure that the spill flights intersect with the conveying flights to create the spill zones necessary for the proper performance of the mixer. As with the conveying flights 7, more or fewer spill flights could be provided. For example, four such spill flights could be used. The spill flights 9 finish by connecting with a conveying flight 7. In the embodiment shown in FIG. 2A, a conveying flight 7 and a spill flight 9 end together at 13. It is not essential that each spill flight terminate at the end of a conveying flight. The spill flight should terminate near the end of the conveying flight to ensure that the trap area is near the end of the mixer and thereby give the mix material the maximum length in the mixer to convert the unmelts to melts. Each spill flight 9 intersects each of the other conveying flights 7 within the mixing section 6. In this embodiment, the clearance of the spill flights 9 from the barrel surface decreases from approximately 10 mm at the entry of the mixing section 6 to about 1-2 mm at the terminal end of the spill flight 9 at a conveying flight 7. The decrease in clearance continues for approximately ⅔ of the distance along the mixing section 6. The gradual reduction in clearance is such that the clearance at the last two spill flight dams 14 and 15 in the spill flight 9 is small enough to, in the sequence of each spill flight 9, act as barriers to prevent any unmelts passing over them. A clearance of 1-2 mm at the dams 14 and 15 is usually sufficient to prevent unmelt passing into the mixer 8.

Of course, a satisfactory mixing section 6 could be created using different clearances. For example, the clearance between the spill flights 9 and the barrel 16 could be kept to a minimum clearance of 1-2 mm for the entire length of the section 6. The clearance at the exit end of the section 6 must be small enough to stop all solid particles from passing into the mixer 8 but can be much larger before that point.

Each of the melt conveying flights 7 in the mixing section 6 has several notches 10 approximately midway between the intersections of the spill flights 9 with the melt conveying flights_7 except where the last portion of the melt conveying flights 7 join their respective ends of the spill flights 9 at 13. These last sections provide fenced areas or trap zones to contain unmelts. These fenced areas or trap zones are bounded on two sides by notched melt conveying flights 7 and on the other two sides by spill flights 9. In the illustrated preferred embodiment shown in FIG. 2A, there are three such fenced areas.

The part of the mixing section 6 that contains notched melt conveying flights 7 allows some of the resin to flow backwards through the notches 10 to an upstream portion of the screw 1 when the pressure caused by a dam in a spill flight 9 overcomes the feeding pressure of the melt generated by the melt conveying flights 7. The degree of this melt exchange and mixing action can be controlled, to a degree, by the size, shape and location of the notches 10. In the preferred embodiment shown in FIG. 2A, the notches 10 are 20-40 mm in width and 2-10 mm deep. As indicated hereinbefore, the notches become shallower as they approach the exit of the mixer 6. The notches are preferably located substantially midway between intersections of the spill flights 9 and melt conveying flights 7.

FIG. 2B illustrates a variation of the mixer section 6. This embodiment includes three conveying flights 7'. A notch 10' is provided between each intersection of a spill flight 9' and conveying flight 7'. The depth of the notches 10' can be constant or can decrease towards the exit of section 6. The last of the slots 10' must be less than 2 mm deep to prevent any solid material from passing through mixer 6. The first of the slots 10' can be up to the full depth of the conveying flight 7'.

In FIG. 2B, each spill flight 9' terminates at an end 13' to provide a barrier to any solid material that may reach that area of the mixer. The spill flights 9' start at a point forward of the beginning of the conveying flights 7' and do not extend to the mixer entrance. The clearance of the spill flights 9' is adjustable. The clearance can be constant over the entire length of the flight 9' at less than 2 mm or may be the full depth of the conveying flight 7' at the beginning of the spill flight to less than 2 mm clearance at the exit of the mixer 6.

FIG. 2C shows a further variation of the mixer 6. In this embodiment there are more conveying flights 7'' than there are spill flights 9''. As with the previous embodiments, the spill flights 9'' must terminate at a conveying flight as shown at 13''. The clearance of the spill flights 9'' and the depth of the slots 10'' can be varied in the same manner as for the previous embodiments.

Figure 2D:
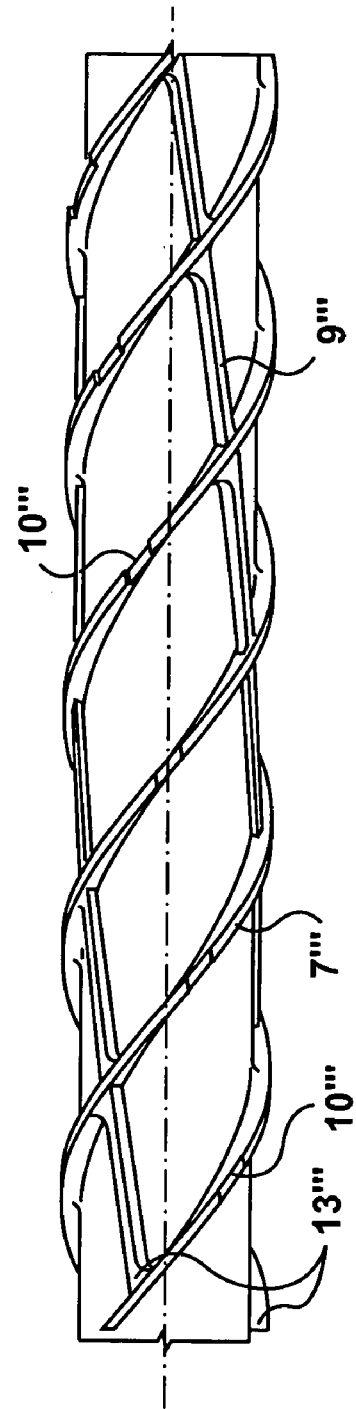

FIG. 2D shows a variation in which the closing point 13''' of the intersecting spill flights 9''' and conveying flights 7''' is located before the end of the mixer section.

In the described embodiments the conveying flights make approximately one and one-half helical turns around the screw shank 11 within the length of the mixing section 6. Obviously, the flights could include more or fewer turns and still provide a satisfactory improvement. Likewise, the provision of three conveying flights works well, however, it is obvious that more or fewer flights could be used with satisfactory results. For example, four such conveying flights could be provided.

All the intersections of the conveying flights 7 and spill flights 9 are rounded or contoured in a manner well understood in the art. The surfaces where the flights attach to the screw shank are also rounded or contoured. This contouring eliminates sharp corners that could create stagnation areas where the resin could become trapped and degrade.

The preferred embodiment has been described as it was implemented on a 140 mm diameter barrel with a 25:1 length to diameter ratio In this particular barrel configuration the conveying flights were 14 mm high. Polyethylene terephthalate (PET) was processed by the screw. It was found that the throughput of the screw increased between 15-30% when the improved mixer and section 6 was formed on the screw when compared to a prior screw that did not have this improved section 6.

The preferred embodiment plasticating screw minimizes shear heating and minimizes the overriding barrel temperature problem where heat generated by the screw raises the barrel temperature above the barrel temperature set point. Tests on the preferred embodiment, illustrated in FIG. 2A, show barrel temperatures remained at least 5° C. below the required set points and consequently did not trigger the alarm. Also performance met melt standards for carbonated soft drink (CSD) and mineral water containers. Furthermore, the intrinsic viscosity loss was kept within acceptable limits.

Satisfactory improvement can be achieved using many variations of our design. The number of conveying flights and spill flights may be increased or decreased. The number of notches in the conveying flights can be varied and their depth changed as required for the specific application. For example, the embodiment shown in FIG. 2A was used with PET. If another thermoplastic material is being processed, different depth channels and spill flight heights may be required.

What is claimed is:

1. A plasticating screw for a molding machine, said plasticating screw comprising at least a feed section, a compression section, and a mixing section, said mixing section having at least one conveying flight and at least one spill flight wherein each of the at least one spill flight begins and ends at a points corresponding respectively to a beginning and ending of said at least one conveying flight, said at least one conveying flight and said at least one spill flight winding around said screw in opposite directions and wherein each said spill flight is continuous.

2. A plasticating screw for a molding machine, said plasticating screw comprising at least a feed section, a compression section, and a mixing section, said mixing section having at least one conveying flight and at least one spill flight wherein each of the at least one spill flight ends at or near a point corresponding to an ending of said at least one conveying flight to thereby form a trap zone for any solid material remaining in said section, said at least one conveying and said at least one spill flights each winding around said screw at differing helix angles, said at least one conveying flight including at least one notch located outside said trap zone wherein each said spill flight is continuous.

3. A plasticating screw as defined in claim 1 wherein each conveying flight includes at least one notch.

4. A plasticating screw as defined in claim 2 or claim 3 wherein each said conveying flight includes notches situated midway between intersections of a spill flight and a conveying flight.

5. A plasticating screw as defined in claim 2, wherein said at least one notch is situated midway between intersections of a spill flight and a conveying flight.

6. A plasticating screw as defined in any one of claims 1, 2, 3 or 5 wherein each said spill flight is dimensioned so as to have diminishing clearance from a surrounding barrel in the direction of material flow in said barrel.

7. A plasticating screw as defined in any one of claims 1, 2, 3 or 5 wherein said plasticating screw includes a final mixing section.

8. A plasticating screw as defined in any one of claims 1, 2, 3 or 5 wherein said plasticating screw includes a final mixing section and said final mixing section is a pineapple mixer.

9. A plasticating screw as defined in claim 1 or claim 3 wherein said conveying flights and said spill flights are spiral flights.

10. A plasticating screw as defined in claim 1 or claim 3 wherein said conveying flights and said spill flights are helical flights.

11. A plasticating screw as defined in any one of claims 1, 2, 3 or 5 wherein said conveying flights circle said screw approximately one and one-half turns and said spill flights approximately one-half turn.

12. A plasticating screw as defined in any one of claims 1, 2, 3 or 5 wherein said mixing section includes three conveying flights and three spill flights.

13. A plasticating screw as defined in claim 5 wherein each said spill flight is continuous.

14. A mixing section for a plasticating screw for a molding machine, said mixing section including at least one conveying flight for conveying melt along said plasticating screw and at least one spill flight, said at least one spill flight preventing solid material from being conveyed beyond said mixing section, said at least one spill flight terminating at one of said at least one conveying flight, said at least one conveying and said at least one spill flights each winding around said screw in opposite directions wherein each said at least one spill flight is continuous.

15. A mixing section as defined in claim 14 wherein each said at least one conveying flight includes at least one notch wherein each said at least one spill flight is continuous.

16. A mixing section as defined in claim 14 wherein each said at least one conveying flight includes notches situated midway between adjacent intersections of said at least one spill flight and a conveying flight wherein each said at least one spill flight is continuous.

17. A mixing section as defined in any one of claims 14, 15 or 16 wherein each said at least one spill flight is dimensioned so as to have diminishing clearance from a surrounding barrel in the direction of material flow in said barrel.

18. A mixing section as defined in any one of claims 14, 15 or 16 wherein each said conveying flight and each said spill flight is a spiral flight.

19. A mixing section as defined in any one of claims 14, 15 or 16 wherein each said conveying flight and each said spill flight is a helical flight.

20. A mixing section as defined in claim 14, claim 15 or claim 16 wherein each said conveying flight circles said screw approximately one and one-half turns and each said spill flight circles said screw approximately one-half turn.

21. A mixing section for a plasticating screw for a molding machine, said section including at least one conveying flight for conveying melt along said plasticating screw and at least one spill flight within said section, terminating said at least one spill flight at said at least one conveying flight near an exit of said section, said terminating forming a trap zone for preventing solid material from being conveyed beyond said section, at least one notch in said at least one conveying flight, said at least one notch being located remotely from said trap zone, said at least one conveying flight winding around said screw at a first helix angle and said at least one spill flight winding around said screw at a second different helix angle, said first helix angle being a forward helix angle and wherein said at leasf one spill flight is continuous.

22. A mixing section for a plasticating screw as defined in claim 21 wherein said second helix angle is a backward helix angle and wherein said at least one spill flight is continuous.

23. A mixing section for a plasticating screw as defined in claim 21 wherein said second helix angle is greater than said first helix angle and wherein said at least one spill flight is continuous.

24. A mixing section for a plasticating screw as defined in claim 22 wherein said second helix angle is greater than said first helix angle and wherein said at least one spill flight is continuous.

25. A mixing section as defined in any one of claims 21, 22, 23 or 24 wherein said at least one notch is situated midway between adjacent intersections of said at least one spill flight and a conveying flight.

26. A mixing section as defined in any one of claims 21, 22, 23, or 24 wherein said at least one spill flight is dimensioned so as to have diminishing clearance from a surrounding barrel in the direction of material flow in said barrel.

27. A mixing section as defined in claim 21, 22, 23, or 24 wherein each said conveying flight circles said screw approximately one and onehalf turns and each said spill flight circles said screw approximately one-half turn.

28. A mixing section for a plasticating screw for a molding machine, said section including a plurality of conveying flights for conveying and mixing melt along said section and at least one spill flight within said section, terminating said at least one spill flight at a conveying flight near an exit of said section, said terminating forming a trap zone for preventing solid material from being conveyed beyond said section, a plurality of notches in each said conveying flight, said notches being located remotely from said trap zone, said conveying flights winding around said screw at a first helix angle and said at least one spill flight winding around said screw at a second different helix angle, said first angle being a forward angle and wherein said at least one spill flight is continuous.

29. A mixing section for a plasticating screw as defined in claim 28 wherein said second angle is a backward angle.

30. A mixing section for a plasticating screw as defined in claim 29 wherein said second angle is greater than said first angle.

31. A mixing section for a plasticating screw as defined in claim 28 wherein said second angle is greater than said first angle.

32. A mixing section as defined in any one of claims 28, 29, 30 or 31 wherein said notches are situated midway between adjacent intersections of said at least one spill flight and a conveying flight.

33. A mixing section as defined in any one of claims 28, 29, 30 or 31 wherein said at least one spill flight is dimensioned so as to have diminishing clearance from a surrounding barrel in the direction of material flow in said barrel.

34. A mixing section as defined in any one of claims 1, 2, 14, 21, or 28 wherein said mixing section has a receiving volume space substantially equal to a volume space of an immediately preceding section of said barrel.

35. A mixing section as defined in any one of claims 28, 29, 30 or 31 wherein each succeeding notch has a clearance from said barrel that is less than the clearance of a preceding notch.

36. A mixing section as defined in claim 28, 29, 30 or 31 wherein each succeeding notch has a clearance from said barrel that is less than the clearance of a preceding notch and each last notch on a conveying flight has a clearance from said barrel that is less than the clearance that would permit unmelts to pass over it.

* * * * *